(12) United States Patent
Murakami

(10) Patent No.: US 10,921,248 B2
(45) Date of Patent: Feb. 16, 2021

(54) MEASUREMENT APPARATUS AND MEASUREMENT METHOD

(71) Applicant: OLYMPUS CORPORATION, Tokyo (JP)

(72) Inventor: Miyuki Murakami, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/660,200

(22) Filed: Oct. 22, 2019

(65) Prior Publication Data

US 2020/0049624 A1 Feb. 13, 2020

Related U.S. Application Data

(63) Continuation of application No. PCT/JP2107/016849, filed on Apr. 27, 2017.

(51) Int. Cl.
*G01N 21/49* (2006.01)
*H04N 5/225* (2006.01)
*H04N 5/235* (2006.01)

(52) U.S. Cl.
CPC .......... *G01N 21/49* (2013.01); *H04N 5/2256* (2013.01); *H04N 5/2351* (2013.01); *H04N 5/2356* (2013.01)

(58) Field of Classification Search
None
See application file for complete search history.

(56) References Cited

U.S. PATENT DOCUMENTS

2005/0267340 A1 12/2005 Ishihara et al.
2010/0010340 A1 1/2010 Godavarty et al.
(Continued)

FOREIGN PATENT DOCUMENTS

JP 08-254497 A 10/1996
JP 2005-328990 A 12/2005
(Continued)

OTHER PUBLICATIONS

International Search Report dated Jul. 25, 2017 received in PCT/JP2017/016849.
(Continued)

*Primary Examiner* — Heather R Jones
(74) *Attorney, Agent, or Firm* — Scully, Scott, Murphy & Presser, P.C.

(57) ABSTRACT

A measurement apparatus includes: a projector configured to project pulse light or light whose intensity is periodically modulated onto a subject; an imaging sensor that includes a plurality of pixels, the imaging sensor being configured to image backscattered light of the light projected by the projector from the subject a plurality of times to output a plurality of image signals; a selection circuit configured to select, for each of the pixels, an image signal closest to a reference light amount from the plurality of image signals; and a characteristic calculation circuit configured to calculate, for each of the pixels, TOF information obtained when the image signal selected by the selection circuit is imaged, acquire light intensity information of the light projected by the projector, and calculate a characteristic of the subject based on the calculated TOF information and the acquired light intensity information.

10 Claims, 9 Drawing Sheets

(56) References Cited

U.S. PATENT DOCUMENTS

2015/0116707 A1* 4/2015 Tatsuda ................. G01J 3/32
356/326
2016/0373669 A1* 12/2016 Ando ................. H04N 5/3559

FOREIGN PATENT DOCUMENTS

| JP | 2007-082608 A | 4/2007 |
| --- | --- | --- |
| JP | 2008-309805 A | 12/2008 |
| JP | 2015-087144 A | 5/2015 |
| JP | 2017-009584 A | 1/2017 |

OTHER PUBLICATIONS

Ri, et al., "Wide-intensity-range Phase Analysis Method Using DMD Camera", Proceedings of JSEM 2006 Annual Conference on Experimental Mechanics, Mar. 13, 2006, No. 6, pp. 25-30, with English Abstract.

* cited by examiner

FIG.4

| 2 | 4 | 6 | 4 | 2 |
|---|---|---|---|---|
| 4 | 6 | 8 | 6 | 4 |
| 6 | 8 | 10 | 8 | 6 |
| 4 | 6 | 8 | 6 | 4 |
| 2 | 4 | 6 | 4 | 2 |

FIRST IMAGE SIGNAL
(EXPOSURE TIME t1)

FIG.5

| 4 | 6 | 8 | 6 | 4 |
|---|---|---|---|---|
| 6 | 8 | 10 | 8 | 6 |
| 8 | 10 | 12 | 10 | 8 |
| 6 | 8 | 10 | 8 | 6 |
| 4 | 6 | 8 | 6 | 4 |

SECOND IMAGE SIGNAL
(EXPOSURE TIME t2)

FIG.6

| 6 | 8 | 10 | 8 | 6 |
|---|---|---|---|---|
| 8 | 10 | 12 | 10 | 8 |
| 10 | 12 | 14 | 12 | 10 |
| 8 | 10 | 12 | 10 | 8 |
| 6 | 8 | 10 | 8 | 6 |

THIRD IMAGE SIGNAL
(EXPOSURE TIME t3)

FIG.7

| 8 | 10 | 12 | 10 | 8 |
|---|---|---|---|---|
| 10 | 12 | 14 | 12 | 10 |
| 12 | 14 | 16 | 14 | 12 |
| 10 | 12 | 14 | 12 | 10 |
| 8 | 10 | 12 | 10 | 8 |

FOURTH IMAGE SIGNAL
(EXPOSURE TIME t4)

FIG.8

| 10 | 12 | 14 | 12 | 10 |
|----|----|----|----|----|
| 12 | 14 | 16 | 14 | 12 |
| 14 | 16 | 18 | 16 | 14 |
| 12 | 14 | 16 | 14 | 12 |
| 10 | 12 | 14 | 12 | 10 |

FIFTH IMAGE SIGNAL
(EXPOSURE TIME t5)

MEASUREMENT APPARATUS AND MEASUREMENT METHOD

CROSS-REFERENCE TO RELATED APPLICATION

This application is a continuation of International Application No. PCT/JP2017/016849, filed on Apr. 27, 2017, the entire contents of which are incorporated herein by reference.

BACKGROUND

1. Technical Field

The present disclosure relates to a measurement apparatus and a measurement method.

2. Related Art

In recent years, an absorption spectroscopy technology for a light-scattering material of a living body or the like has been developed. Light projected onto a light-scattering material of a living body or the like is propagated while being repeatedly subjected to multiple scattering inside the light-scattering material, and a part thereof is emitted to the outside of the living body as backscattered light. Inverse analysis calculation is performed by using a value obtained by imaging this backscattered light, and therefore it is possible to estimate an absorption coefficient distribution, a scattering coefficient distribution, and the like of the living body.

As such a measurement method, there is a time-of-flight (TOF) method (for example, see JP 8-254497 A and JP 2007-82608 A). In the TOF method, a characteristic of inside of a living body is estimated by projecting light whose intensity is periodically modulated onto a subject serving as a measurement target and calculating a distance at which the light is propagated through inside of the subject (internal propagation distance) on the basis of a phase shift in intensity modulation between the projected light and backscattered light (TOF information).

SUMMARY

In some embodiments, a measurement apparatus includes: a projector configured to project pulse light or light whose intensity is periodically modulated onto a subject; an imaging sensor that includes a plurality of pixels, the imaging sensor being configured to image backscattered light of the light projected by the projector from the subject a plurality of times to output a plurality of image signals; a selection circuit configured to select, for each of the pixels, an image signal closest to a reference light amount from the plurality of image signals; and a characteristic calculation circuit configured to calculate, for each of the pixels, TOF information obtained when the image signal selected by the selection circuit is imaged, acquire light intensity information of the light projected by the projector, and calculate a characteristic of the subject based on the calculated TOF information and the acquired light intensity information.

In some embodiments, a measurement apparatus includes: a projector configured to project pulse light or light whose intensity is periodically modulated onto a subject; an imaging sensor that includes a plurality of pixels, the imaging sensor being configured to image backscattered light of the light projected by the projector from the subject a plurality of times to output a plurality of image signals; a selection circuit configured to select, for each of the pixels, an image signal closest to a reference light amount from the plurality of image signals; and a characteristic calculation circuit configured to calculate, for each of the pixels, TOF information obtained when the image signal selected by the selection circuit is imaged and calculate a characteristic of the subject based on the TOF information. The projector is configured to project the light while changing a light amount, and the imaging sensor is configured to perform imaging a plurality of times in each of which the light amount of the light projected from the projector is different.

In some embodiments, provided is a measurement method executed by a measurement apparatus that includes an imaging sensor including a plurality of pixels and measures a characteristic of a subject. The method includes: projecting pulse light or light whose intensity is periodically modulated onto the subject; imaging backscattered light of the projected light from the subject a plurality of times to output a plurality of image signals; selecting, for each of the pixels, an image signal closest to a reference light amount from the plurality of image signals; calculating, for each of the pixels, TOF information obtained when the selected image signal is imaged; acquiring light intensity information of the projected light; and calculating a characteristic of the subject based on the calculated TOF information and the acquired light intensity information.

In some embodiments, provided is a measurement method executed by a measurement apparatus that includes an imaging sensor including a plurality of pixels and measures a characteristic of a subject. The method includes: projecting pulse light or light whose intensity is periodically modulated onto the subject while changing a light amount; imaging backscattered light of the projected light from the subject a plurality of times in each of which the light amount of the light projected from the projector is different to output a plurality of image signals; selecting, for each of the pixels, an image signal closest to a reference light amount from the plurality of image signals; calculating, for each of the pixels, TOF information obtained when the selected image signal is imaged; and calculating a characteristic of the subject based on the TOF information.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 4 illustrates an image signal imaged in first measurement;

FIG. 5 illustrates an image signal imaged in second measurement;

FIG. 6 illustrates an image signal imaged in third measurement;

FIG. 7 illustrates an image signal imaged in fourth measurement;

FIG. 8 illustrates an image signal imaged in fifth measurement;

DETAILED DESCRIPTION

Figure 1:
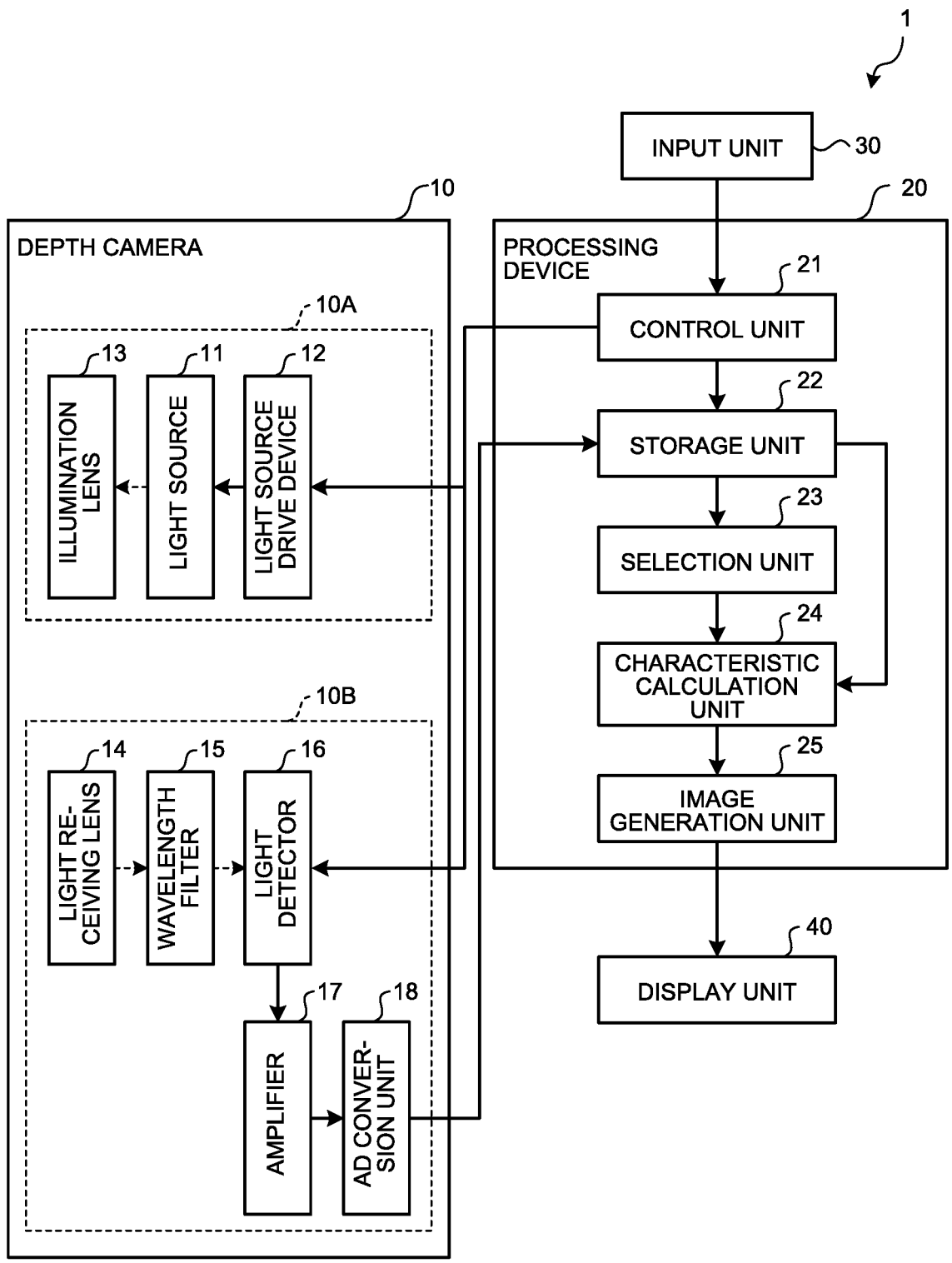
FIG. 1 is a schematic diagram illustrating a configuration of a measurement apparatus according to a first embodiment.

Hereinafter, embodiments of a measurement apparatus and a measurement method according to the disclosure will be described with reference to the drawings. Note that the disclosure is not limited by those embodiments. The disclosure is applicable to general measurement apparatuses and measurement methods for measuring TOF information.

Further, in the drawings, the same or corresponding elements are appropriately denoted by the same reference signs. Furthermore, the drawings are schematically illustrated, and dimensional relationships, ratios, or the like between the elements may be different from those of actual one. In addition, the drawings may include portions having different positional relationships or ratios.

First Embodiment

FIG. 1 is a schematic diagram illustrating a configuration of a measurement apparatus according to a first embodiment. As illustrated in FIG. 1, a measurement apparatus 1 according to the first embodiment includes a depth camera 10 that projects light onto a subject and images backscattered light from the subject, a processing device 20 that processes a signal acquired by the depth camera 10, an input unit 30 that accepts various kinds of input from a user, and a display unit 40 that displays an image generated by the processing device 20.

The depth camera 10 includes a projector 10A that projects light whose light intensity is periodically modulated onto a subject 2 and an imaging sensor 10B that images backscattered light of the projected light from the subject 2.

The projector 10A includes a light source 11 that projects light onto the subject 2, a light source drive device 12 that controls driving of the light source 11, and an illumination lens 13 for irradiating a predetermined range of the subject 2 with the light projected by the light source 11.

The imaging sensor 10B includes a light receiving lens 14 that condenses backscattered light from the subject 2, a wavelength filter 15 that transmits only light of a predetermined wavelength, a light detector 16 that detects the light transmitted through the wavelength filter 15, an amplifier 17 that amplifies a signal output by the light detector 16, and an AD conversion unit 18 that AD-converts the signal amplified by the amplifier 17.

Figure 2:
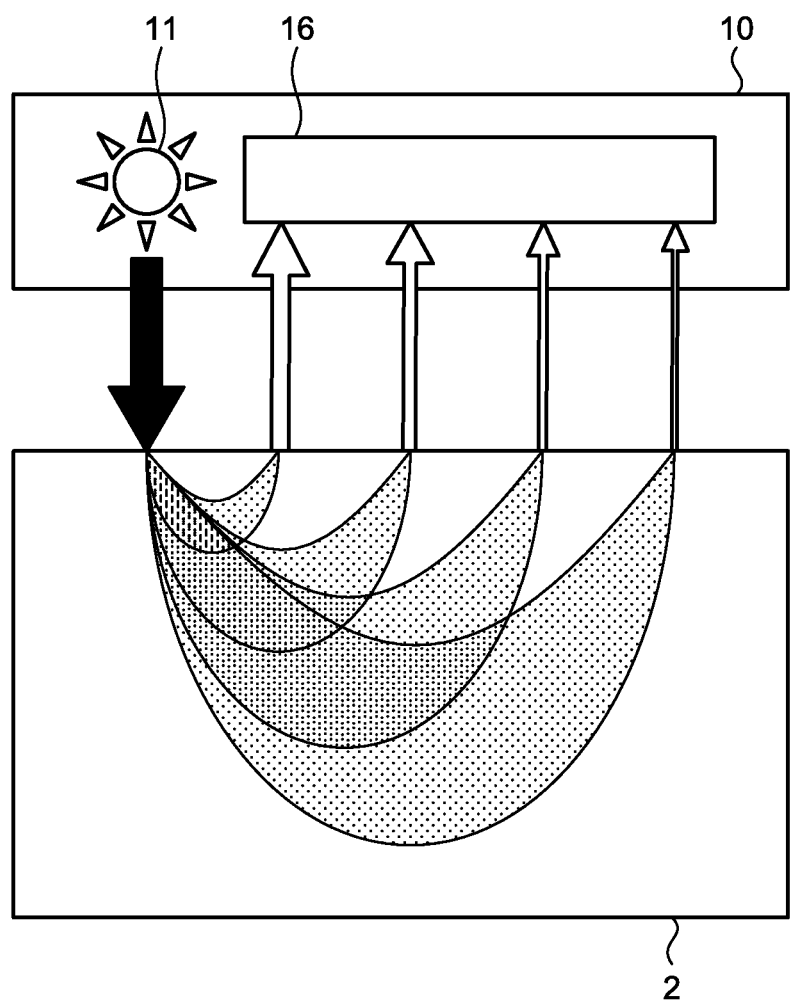
FIG. 2 illustrates a state in which the measurement apparatus illustrated in FIG. 1 measures a subject.

FIG. 2 illustrates a state in which the measurement apparatus illustrated in FIG. 1 measures a subject. FIG. 2 illustrates, for example, angled light projected from the light source 11 and angled light incident on the light detector 16. However, this path is one of a plurality of paths of illumination light, which is selected in order to describe a path that light travels. Further, the light source 11 and the light detector 16 may be placed so that an optical axis of the light projected from the light source 11 and an optical axis of the light incident on the light detector 16 intersect at an acute angle to a surface of the subject 2, or the light source 11 and the light detector 16 may be placed so that the optical axes intersect at a combination of a plurality of different angles to the surface of the subject 2.

Further, the depth camera 10 is placed not to be in contact with the subject 2. In a case where the subject 2 serving as a living body is measured in a medical site, it is preferable that the depth camera 10 be placed not to be in contact with the subject 2 in view of preventing contamination of the subject 2. However, the depth camera 10 may be placed to be in contact with the subject 2.

The light source 11 is, for example, a light emitting diode (LED) and projects light having a wavelength of 850 nm. The light source 11 projects light whose light intensity has been modulated to form a sine wave of 30 MHz under the control of the light source drive device 12. However, the intensity of the light projected from the light source 11 may be modulated to form a pulse or a rectangular wave, and a modulation frequency is not particularly limited. Further, the wavelength of the light projected from the light source 11 is not particularly limited and may be variable or may be light having a wide wavelength band.

The illumination lens 13 is, for example, a high NA (for example, a both-side opening angle is 90°) diffusion lens that diffuses the light projected from the light source 11.

The light receiving lens 14 is, for example, a high NA (for example, a both-side opening angle is 90°) condenser lens that condenses backscattered light from the subject 2.

The wavelength filter 15 is, for example, a bandpass filter that selectively transmits only light having a wavelength of or about 850 nm. The wavelength filter 15 transmits only backscattered light from the subject 2 and prevents stray light having wavelengths other than the above wavelength from being incident on the light detector 16.

The light detector 16 is a complementary metal oxide semiconductor (CMOS) line sensor including a plurality of pixels. The light detector 16 converts received light in each pixel into an electric signal by photoelectric conversion. However, the light detector 16 may be a charge coupled devices (CCD) line sensor including a plurality of pixels. Further, the light detector 16 may be a two-dimensional sensor.

The amplifier 17 amplifies the electric signal output by the light detector 16 and outputs the amplified electric signal. The AD conversion unit 18 converts (AD-converts) the electric signal that is an analog signal amplified by the amplifier 17 into a digital signal and outputs the digital signal.

The processing device 20 includes a control unit 21, a storage unit 22, a selection unit 23, a characteristic calculation unit 24, and an image generation unit 25.

The control unit 21 is achieved by using a central processing unit (CPU) or the like. The control unit 21 controls processing operation of each unit of the processing device 20. The control unit 21 controls operation of the processing device 20 by, for example, transferring instruction information and data to each configuration of the processing device 20. Further, the control unit 21 controls the projector 10A and the imaging sensor 10B so that operations of the light source 11 and the light detector 16 are synchronized. The control unit 21 performs measurement a plurality of times while changing measurement conditions in the projector 10A and the imaging sensor 10B. Specifically, the control unit 21 performs measurement a plurality of times while changing exposure time in the imaging sensor 10B. Further, the control unit 21 may perform measurement a plurality of times while changing light intensity of light projected from the projector 10A. Furthermore, the control unit 21 outputs information regarding a phase of the light projected from the projector 10A and light intensity information thereof to the storage unit 22.

The storage unit 22 stores a plurality of image signals obtained by the imaging sensor 10B performing imaging a plurality of times. The storage unit 22 further stores the information regarding the phase of the light projected from the projector 10A and the light intensity information thereof. The storage unit 22 further stores various programs including an operation program for executing an operation method of the measurement apparatus 1. The various programs including the operation program can also be recorded on a computer readable recording medium such as a hard disk, a flash memory, a CD-ROM, a DVD-ROM, or a flexible disk to be widely distributed. Note that the above-mentioned various programs can also be acquired by being downloaded via a communication network. The communication network herein is achieved by, for example, an existing public network, a local area network (LAN), a wide area network (WAN), or the like and may be a wired or wireless network.

The storage unit 22 is achieved by using a read only memory (ROM) in which the various programs and the like have been installed in advance, a random access memory (RAM) that stores operation parameters, data, and the like of each processing, or the like.

The selection unit 23 sequentially reads out a plurality of image signals from the storage unit 22 and selects, for each pixel, an image signal closest to a reference light amount from the plurality of image signals. The reference light amount may be a value set in advance, may be a value determined in response to input from the user, or may be a value determined on the basis of the image signals imaged by the imaging sensor 10B. For example, the reference light amount may be a light amount of a pixel having the largest light amount obtained as a result of comparing light amounts of the respective pixels in an image signal imaged in first measurement. Note that it is preferable that the reference light amount be a light amount in which, by checking measurement conditions (a reflectance of the subject 2, intensity of the light projected from the projector 10A, an amplitude of the light projected from the projector 10A, exposure time in the imaging sensor 10B, and the like) in advance, a signal-to-noise ratio (SN ratio) at which each pixel is not saturated and a characteristic of the subject can be calculated with high accuracy is obtained. The selection unit 23 is achieved by using a CPU or the like.

The characteristic calculation unit 24 calculates, for each pixel, TOF information obtained when the image signal selected by the selection unit 23 is imaged. The TOF information is a phase difference in intensity modulation between the light projected from the projector 10A and the light imaged by the imaging sensor 10B. Specifically, the characteristic calculation unit 24 reads out, for each pixel, information regarding a phase of the light projected from the projector 10A and information regarding a phase of the light imaged by the imaging sensor 10B, each information being obtained when the image signal selected by the selection unit 23 is imaged, from the storage unit 22, compares the readout phases, and calculates a phase shift $\phi$.

Further, the characteristic calculation unit 24 calculates a characteristic of the subject 2 on the basis of the calculated TOF information and the light intensity information read out from the storage unit 22.

Specifically, the characteristic calculation unit 24 calculates an internal propagation distance of the light in the subject 2 by using the TOF information (phase shift $\phi$) of each pixel. Then, the characteristic calculation unit 24 performs inverse analysis calculation by using the calculated internal propagation distance and the light intensity information, thereby calculating a scattering coefficient distribution, an absorption coefficient distribution, a distribution of anisotropic parameters, or the like inside the subject 2 as the characteristic of the subject 2. As an example, the characteristic calculation unit 24 assumes a scattering coefficient distribution inside the subject 2, solves a model by a diffusion equation (DE) and a radiative transfer equation (RTE) by using those assumed scattering coefficients, and repeatedly performs optimization calculation and physical property estimation, and therefore calculates a scattering coefficient distribution inside the subject 2. The characteristic calculation unit 24 is achieved by using a CPU or the like.

The image generation unit 25 generates an image signal on the basis of the characteristic of the inside of the subject 2 calculated by the characteristic calculation unit 24 and outputs the image signal to the display unit 40. Specifically, the image generation unit 25 generates an image signal whose gradation, color, contrast, and the like have been changed in accordance with the distribution of the characteristic inside the subject 2 calculated by the characteristic calculation unit 24. The image generation unit 25 may generate an image signal by superimposing an image whose color and the like have been changed in accordance with the distribution of the characteristic on a 2D or 3D image, an ultrasonic image, or the like imaged by various cameras. The image generation unit 25 is achieved by using a CPU or the like.

Note that the control unit 21, the selection unit 23, the characteristic calculation unit 24, and the image generation unit 25 can also be configured by using a common CPU or the like.

The input unit 30 is achieved by using an operation device such as a mouse, a keyboard, and a touchscreen and accepts input of various kinds of instruction information to the measurement apparatus 1.

The display unit 40 is configured by using a liquid crystal display, an organic electro luminescence (EL) display, or the like. The display unit 40 displays an image based on the image signal output by the image generation unit 25.

Figure 3:
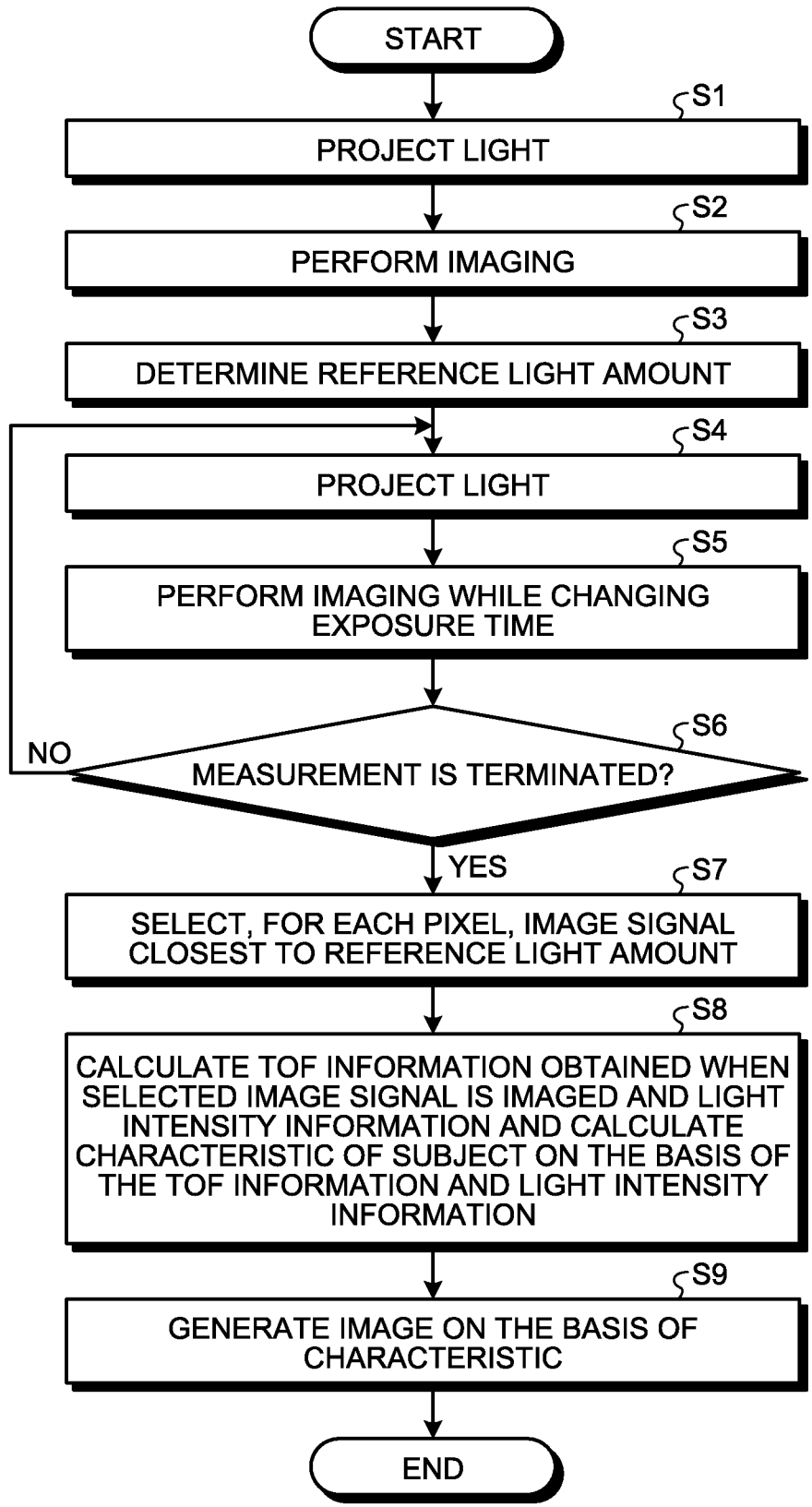
FIG. 3 is a flowchart illustrating operation in which the measurement apparatus illustrated in FIG. 1 measures a subject.

FIG. 3 is a flowchart illustrating operation in which the measurement apparatus illustrated in FIG. 1 measures a subject. As illustrated in FIG. 3, first, the light source drive device 12 projects light onto the subject 2 from the light source 11 via the illumination lens 13 under the control of the control unit 21 (Step S1). At this time, the control unit 21 outputs information regarding a phase of the projected light and light intensity information thereof to the storage unit 22.

Simultaneously, the light detector 16 images light that has been synchronously controlled by the control unit 21, has been backscattered from the subject 2, and has passed through the light receiving lens 14 and the wavelength filter 15 (Step S2). The light detector 16 converts an optical signal of the received light into an electric signal. Further, this electric signal is amplified by the amplifier 17, is AD-converted by the AD conversion unit 18, and is output to the processing device 20. Then, the output signal is stored on the storage unit 22 of the processing device 20.

Then, the control unit 21 determines a reference light amount on the basis of an image signal imaged in first measurement (Step S3). FIG. 4 illustrates the image signal imaged in the first measurement. In FIG. 4, light amounts of the light received by the respective pixels of the light detector 16 are indicated in the form of numerical values. The control unit 21 determines, as the reference light amount, a value of 10 indicating the largest light amount in the image signal imaged in the first measurement. Note that, in the first measurement, exposure time in the light detector 16 is t1.

Thereafter, the light source drive device 12 projects light onto the subject 2 from the light source 11 via the illumination lens 13 under the control of the control unit 21 as in Step S1 (Step S4). At this time, the control unit 21 outputs information regarding a phase of the projected light and light intensity information thereof to the storage unit 22.

Simultaneously, imaging is performed for exposure time different from the exposure time in Step S2 (Step S5). The light detector 16 converts an optical signal of the received light into an electric signal. Further, this electric signal is amplified by the amplifier 17, is AD-converted by the AD conversion unit 18, and is output to the processing device 20. Then, the output signal is stored on the storage unit 22 of the processing device 20.

Then, the control unit 21 performs imaging a predetermined number of times and determines whether or not measurement is terminated (Step S6). In a case where the control unit 21 determines that measurement is not terminated (Step S6: No), the measurement in Steps S4 and S5 is repeatedly executed.

Meanwhile, in a case where the control unit 21 determines that measurement is terminated (Step S6: Yes), the selection unit 23 sequentially reads out a plurality of image signals from the storage unit 22 and selects, for each pixel, an image signal closest to the reference light amount from the plurality of image signals imaged by the imaging sensor 10B (Step S7).

FIGS. 5 to 8 illustrate image signals imaged in second to fifth measurements, respectively. Herein, a case where imaging is performed five times will be described. In FIGS. 5 to 8, light amounts of the light received by the respective pixels of the light detector 16 are indicated in the form of numerical values as in FIG. 4. Exposure time in the light detector 16 in each measurement has a relationship of t1<t2<t3<t4<t5.

The characteristic calculation unit 24 calculates, for each pixel, TOF information on the basis of an image signal imaged when an image signal closest to 10 serving as the reference light amount is obtained. That is, in FIGS. 4 to 8, the characteristic calculation unit 24 calculates, for each pixel, TOF information obtained when a hatched image signal is imaged.

Then, the characteristic calculation unit 24 calculates the characteristic of the subject 2 by using the calculated TOF information and the light intensity information read out from the storage unit 22 (Step S8).

Further, the image generation unit 25 generates an image on the basis of the characteristic of the subject 2 calculated by the characteristic calculation unit 24 (Step S9).

As described above, according to the first embodiment, the characteristic of the inside of the subject 2 is calculated in the characteristic calculation unit 24 by using the TOF information imaged in the reference light amount and the light intensity information, and therefore substantially equal SN can be secured in all pixels. Thus, it is possible to measure highly reliable TOF information regardless of an amount of backscattered light.

First Modification Example

Figure 9:
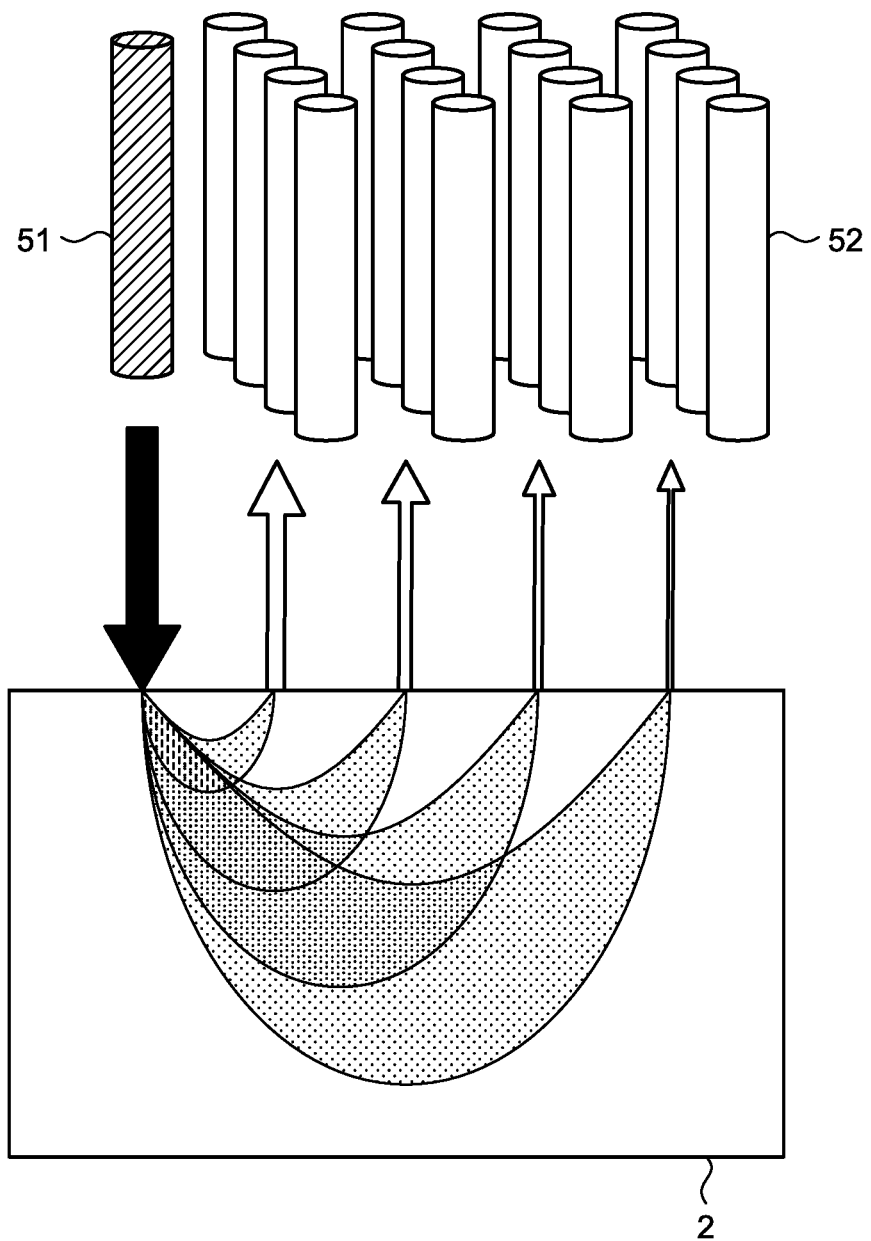
FIG. 9 illustrates a state in which a measurement apparatus according to a first modification example measures a subject.

FIG. 9 illustrates a state in which a measurement apparatus according to a first modification example measures a subject. As illustrated in FIG. 9, the projector 10A may project light onto the subject 2 through an optical fiber 51. Similarly, the imaging sensor 10B may receive light through optical fibers 52 arranged in an array.

According to the first modification example, measurement is performed while the optical fiber 51 and the optical fibers 52 are being close to the subject 2, and therefore it is possible to project light and receive light while the projector 10A and the imaging sensor 10B are not being in contact with the subject 2 but are being in the vicinity thereof.

Second Modification Example

Figure 10:
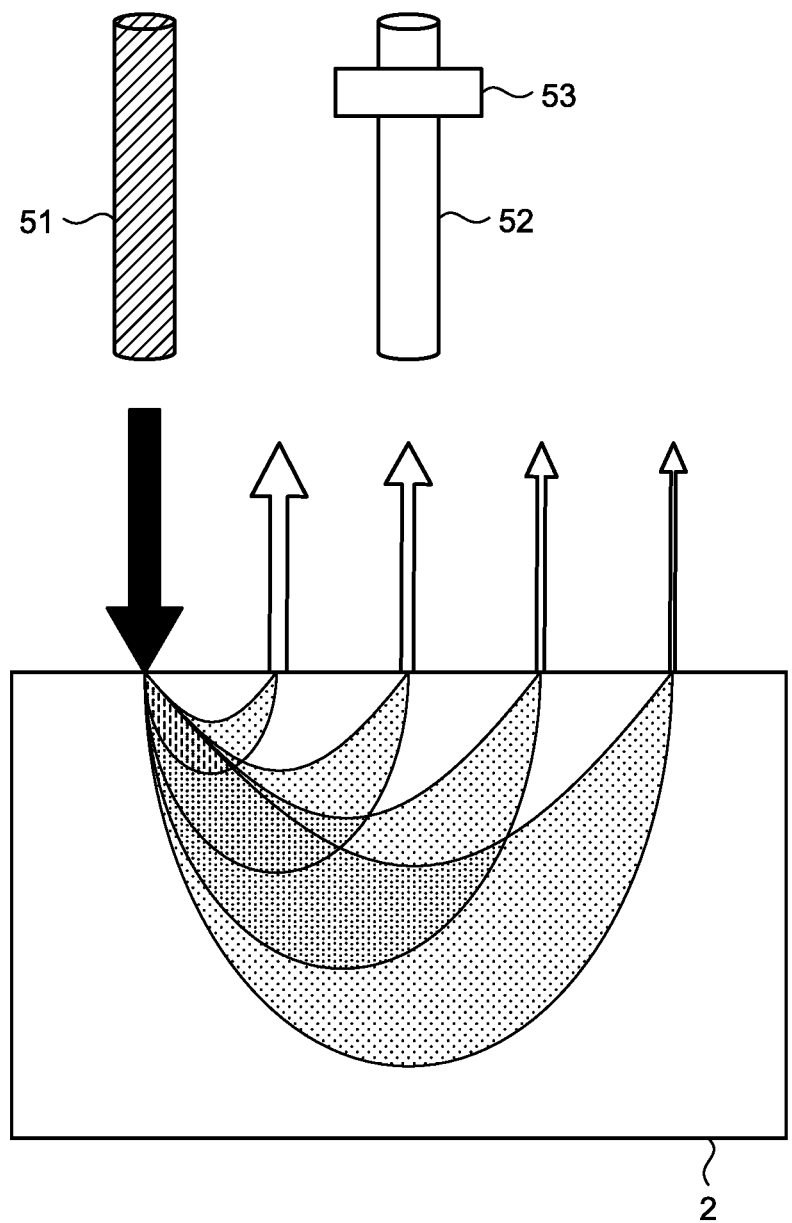
FIG. 10 illustrates a state in which a measurement apparatus according to a second modification example measures a subject.

FIG. 10 illustrates a state in which a measurement apparatus according to a second modification example measures a subject. As illustrated in FIG. 10, the imaging sensor 10B may receive light while a single optical fiber 52 is being moved by a moving unit 53 such as a stage.

According to the second modification example, a simpler configuration than that of the first modification example can be achieved because the number of optical fibers is reduced.

Note that, in the above-mentioned embodiment, there has been described a configuration in which a phase shift in intensity modulation between light projected from the light source 11 and light imaged by the light detector 16 is used as TOF information. However, the disclosure is not limited thereto. For example, in a case where light projected from the light source 11 is pulse light, a time delay between projection of pulse light from the light source 11 and imaging of return light from the subject 2 may be used as the TOF information.

Figure 11:
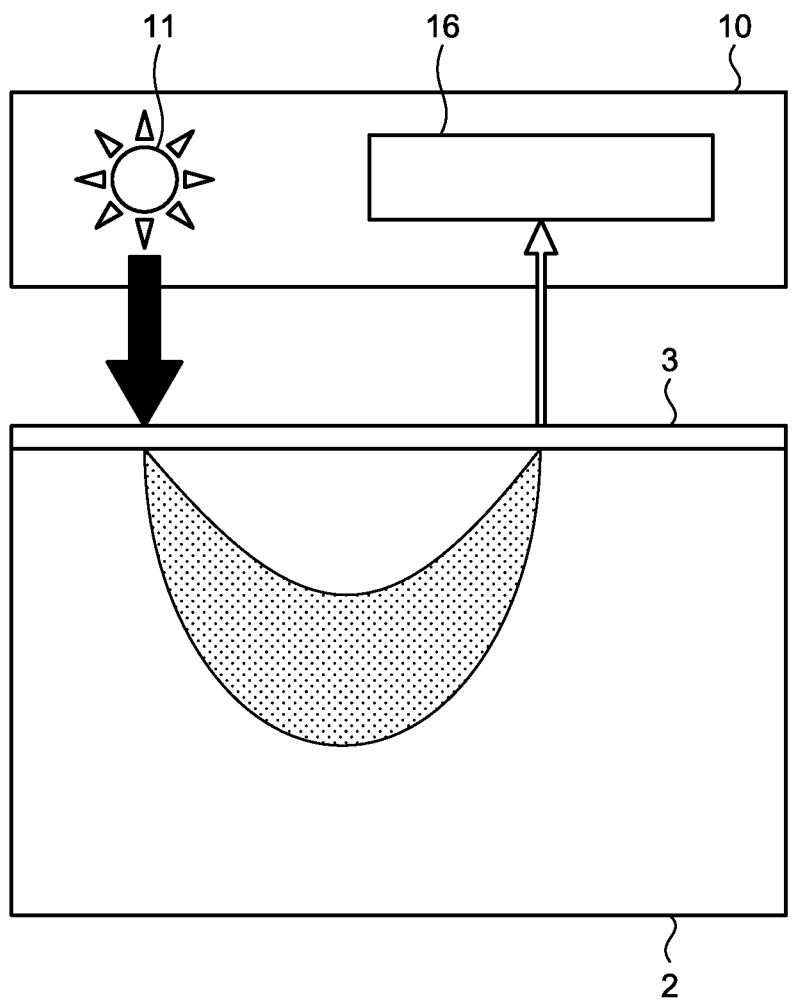
FIG. 11 illustrates a state in which a distance from a surface of a subject to a projector and an imaging sensor is measured.

Further, in the above-mentioned embodiment, the characteristic calculation unit 24 may calculate the characteristic of the subject 2 on the basis of a distance from a surface of the subject 2 to the projector 10A and the imaging sensor 10B. FIG. 11 illustrates a state in which a distance from the surface of the subject to the projector and the imaging sensor is measured. As illustrated in FIG. 11, a reference member 3 is placed on the surface of the subject 2. The reference member 3 is made from a member having a high reflectance with respect to a wavelength band of light projected from the light source 11. Then, the characteristic calculation unit 24 calculates a distance from a surface of the reference member 3 to the projector 10A and the imaging sensor 10B on the basis of a phase difference in intensity modulation between a phase of light projected from the light source 11 and a phase of light reflected by the reference member 3. Further, the characteristic calculation unit 24 adds an already-known thickness of the reference member 3 to the calculated distance and therefore calculates a distance from the surface of the subject 2 to the projector 10A and the imaging sensor 10B.

Then, the characteristic calculation unit 24 calculates an internal propagation distance on the basis of a phase difference in intensity modulation between light projected from the projector 10A and light imaged by the imaging sensor 10B and the distance from the surface of the subject 2 to the projector 10A and the imaging sensor 10B. As described above, even in a case where the subject 2 and the depth camera 10 are placed not to be in contact with each other, the internal propagation distance can be calculated by using the reference member 3. Note that the reference light amount may be a light amount of a pixel having the largest light amount obtained as a result of comparing light amounts of the respective pixels in an image signal imaged in measurement of the distance from the surface of the reference member 3 to the projector 10A and the imaging sensor 10B.

Further, in the above-mentioned embodiment, there has been described an example where the characteristic calculation unit 24 reads out light intensity information from the storage unit 22. However, the disclosure is not limited thereto. For example, the characteristic calculation unit 24 may determine light intensity information by sequentially reading out a plurality of image signals and selecting, from the plurality of image signals, an image signal of a pixel having the largest light receiving amount closest to the reference light amount.

Further, in the above-mentioned embodiment, there has been described an example where the control unit 21 performs measurement a plurality of times while changing measurement conditions in the projector 10A and the imaging sensor 10B. However, the disclosure is not limited thereto. In a case where a sensitivity characteristic in each pixel of the light detector 16 is already known, the characteristic calculation unit 24 may calculate the characteristic of the subject 2 on the basis of a single imaging result and the sensitivity characteristic.

According to the disclosure, it is possible to achieve a measurement apparatus and a measurement method, each of which can measure highly reliable TOF information regardless of an amount of backscattered light.

The above and other features, advantages and technical and industrial significance of this disclosure will be better understood by reading the following detailed description of presently preferred embodiments of the disclosure, when considered in connection with the accompanying drawings.

What is claimed is:

1. A measurement apparatus, comprising:
   a projector configured to project pulse light or light whose intensity is periodically modulated onto a subject;
   an imaging sensor that includes a plurality of pixels, the imaging sensor being configured to image backscattered light of the light projected by the projector from the subject a plurality of times to output a plurality of image signals; and
   a processor comprising hardware, the processor being configured to:
     select, for each of the pixels, an image signal closest to a reference light amount from the plurality of image signals; and
     calculate, for each of the pixels, time-of-flight (TOF) information obtained when the selected image signal is imaged, acquire light intensity information of the light projected by the projector, and calculate a characteristic of the subject based on the calculated TOF information and the acquired light intensity information;
   wherein the projector is configured to project the light while changing a light amount, and
   the imaging sensor is configured to perform imaging a plurality of times in each of which the light amount of the light projected from the projector is different.

2. The measurement apparatus according to claim 1, wherein the imaging sensor is configured to perform imaging the plurality of times while changing exposure time.

3. The measurement apparatus according to claim 1, wherein the reference light amount is a light amount in which a signal-to-noise ratio is obtained, the signal-to-noise ratio being a ratio at which the plurality of pixels is not saturated.

4. The measurement apparatus according to claim 1, wherein the reference light amount is determined based on the image signals imaged by the imaging sensor.

5. The measurement apparatus according to claim 1, wherein the TOF information is a phase difference in intensity modulation between the light projected from the projector and the light imaged by the imaging sensor.

6. The measurement apparatus according to claim 1, wherein the processor is configured to calculate the characteristic of the subject based on a distance from a surface of the subject to the projector and the imaging sensor.

7. The measurement apparatus according to claim 1, wherein the processor is configured to calculate the characteristic of the subject based on light intensity information determined from the plurality of image signals imaged by the imaging sensor.

8. The measurement apparatus according to claim 1, wherein the processor is configured to acquire the light intensity information of the light projected by the projector when the selected image signal is imaged and calculate the characteristic of the subject based on the calculated TOF information and the acquired light intensity information.

9. A measurement apparatus, comprising:
   a projector configured to project pulse light or light whose intensity is periodically modulated onto a subject;
   an imaging sensor that includes a plurality of pixels, the imaging sensor being configured to image backscattered light of the light projected by the projector from the subject a plurality of times to output a plurality of image signals; and
   a processor comprising hardware, the processor being configured to:
     select, for each of the pixels, an image signal closest to a reference light amount from the plurality of image signals; and
     calculate, for each of the pixels, time-of-flight (TOF) information obtained when the selected image signal is imaged and calculate a characteristic of the subject based on the TOF information, wherein
   the projector is configured to project the light while changing a light amount, and
   the imaging sensor is configured to perform imaging a plurality of times in each of which the light amount of the light projected from the projector is different.

10. A measurement method executed by a measurement apparatus that includes an imaging sensor including a plurality of pixels and measures a characteristic of a subject, the method comprising:
    projecting pulse light or light whose intensity is periodically modulated onto the subject while changing a light amount;
    imaging backscattered light of the projected light from the subject a plurality of times in each of which the light amount of the light projected from the projector is different to output a plurality of image signals;
    selecting, for each of the pixels, an image signal closest to a reference light amount from the plurality of image signals;
    calculating, for each of the pixels, time-of-flight (TOF) information obtained when the selected image signal is imaged; and
    calculating a characteristic of the subject based on the TOF information.

* * * * *